United States Patent
Wilson

[15] 3,658,562
[45] Apr. 25, 1972

[54] METHOD OF PURGING AIR FROM CONTAINERS

[72] Inventor: Donald C. Wilson, San Jose, Calif.
[73] Assignee: FMC Corporation, San Jose, Calif.
[22] Filed: Nov. 20, 1969
[21] Appl. No.: 878,504

[52] U.S. Cl. ................................99/215, 99/171, 99/181, 99/404
[51] Int. Cl. ..................A23l 3/02, B65b 31/00, B65b 55/02
[58] Field of Search ..............99/171, 171 H, 174, 182, 214, 99/271, 185, 181, 215; 23/281; 21/56; 53/22

[56] References Cited

UNITED STATES PATENTS

| | | | |
|---|---|---|---|
| 2,380,134 | 7/1945 | Waters | 99/214 |
| 3,108,881 | 10/1963 | Shaw et al | 99/171 |
| 3,132,029 | 5/1964 | Beck | 99/171 H |
| 3,261,140 | 7/1966 | Long et al | 99/171 |
| 3,377,173 | 4/1968 | Van Der Winden | 99/214 |
| 3,395,025 | 7/1968 | Hermanson | 99/171 H |
| 3,481,688 | 12/1969 | Craig et al. | 21/56 |
| 3,037,869 | 6/1962 | Esson et al. | 99/214 X |
| 3,501,318 | 3/1970 | Wilson | 99/185 |

FOREIGN PATENTS OR APPLICATIONS 841,015 7/1960 Great Britain .....................99/171 H

OTHER PUBLICATIONS

Encyclopedia of Chemical Technology Kirk-Othmen Vol. 2 (1963) page 2.

Primary Examiner—Norman Yudkoff
Assistant Examiner—Kenneth P. Van Wyck
Attorney—F. W. Anderson and C. E. Tripp

[57] ABSTRACT

Method for purging air from plastic-aluminum containers such as pouches filled with a water containing food product by forming one-way valve in each pouch and thereafter immersing each pouch and moving the pouch through a heating medium at a sufficient temperature and for a sufficient period to form hydrogen within each pouch. The headspace is first reduced by immersing of the pouches and thereafter hydrogen purges the remaining air and gases out of the one-way valve leaving a hydrogen rich gas therein. Each pouch is thereafter sealed.

9 Claims, 8 Drawing Figures

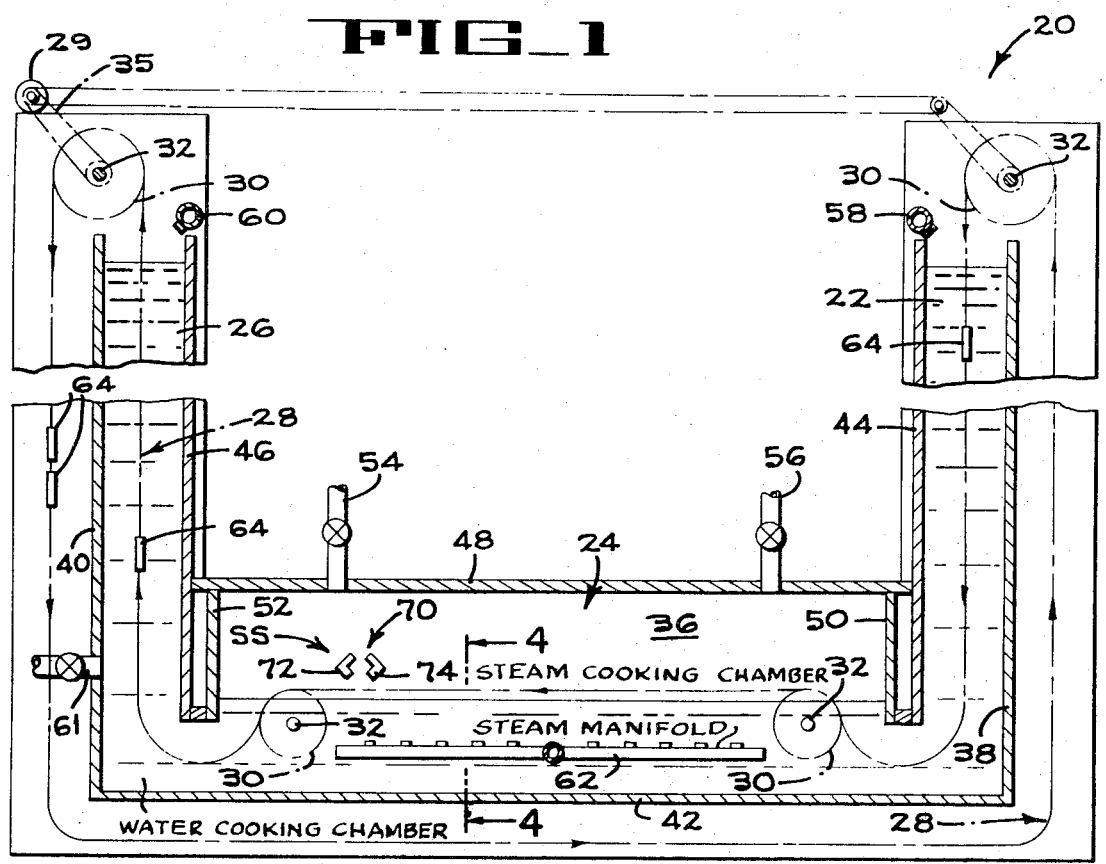

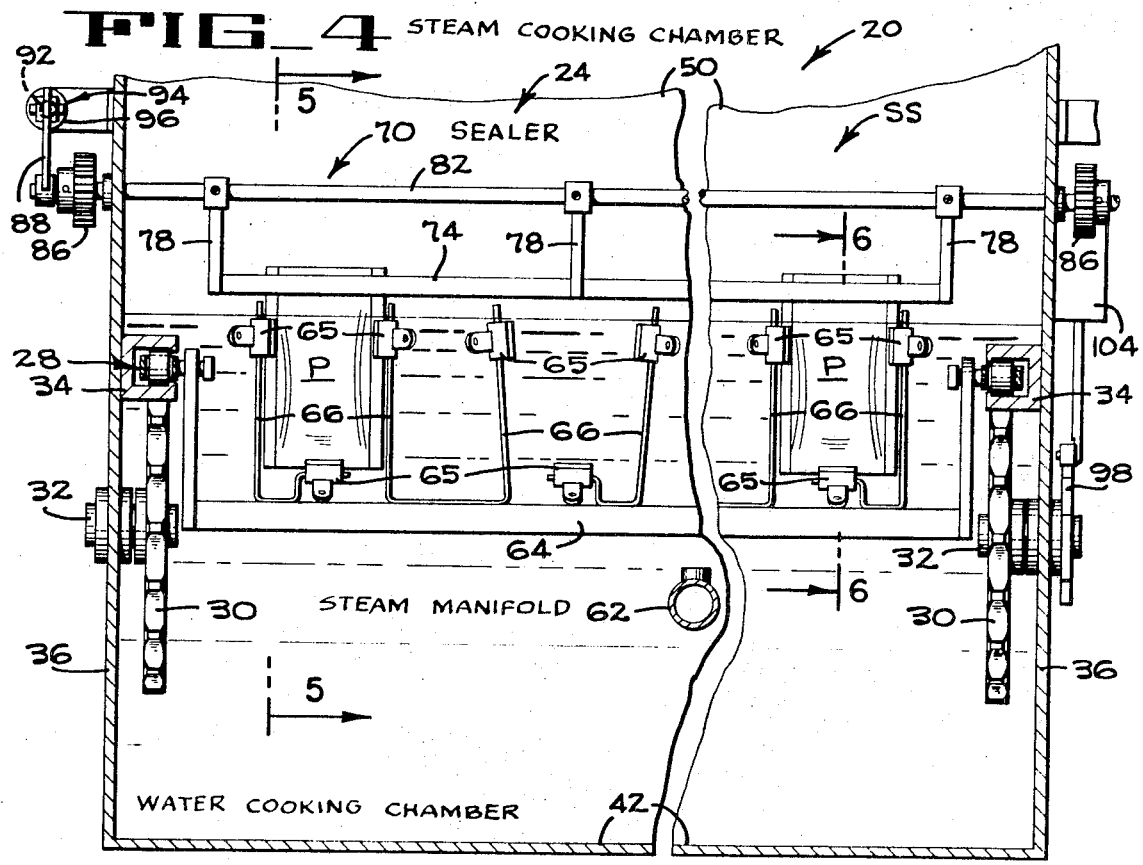
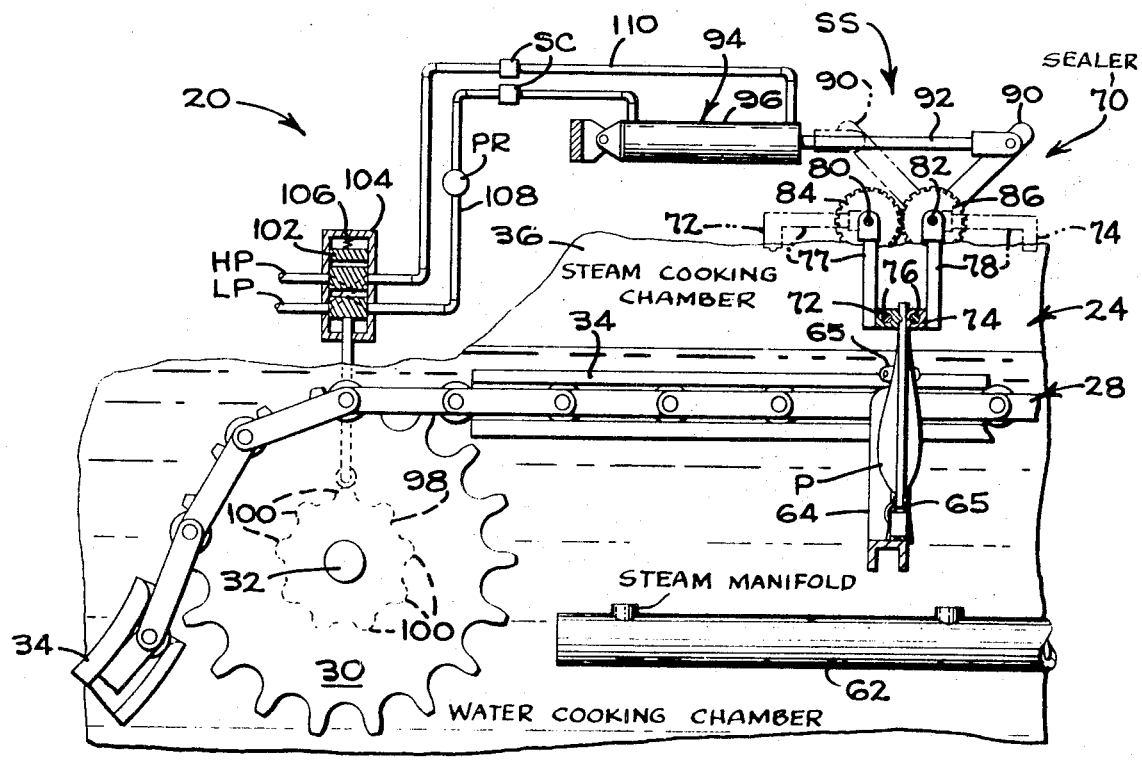

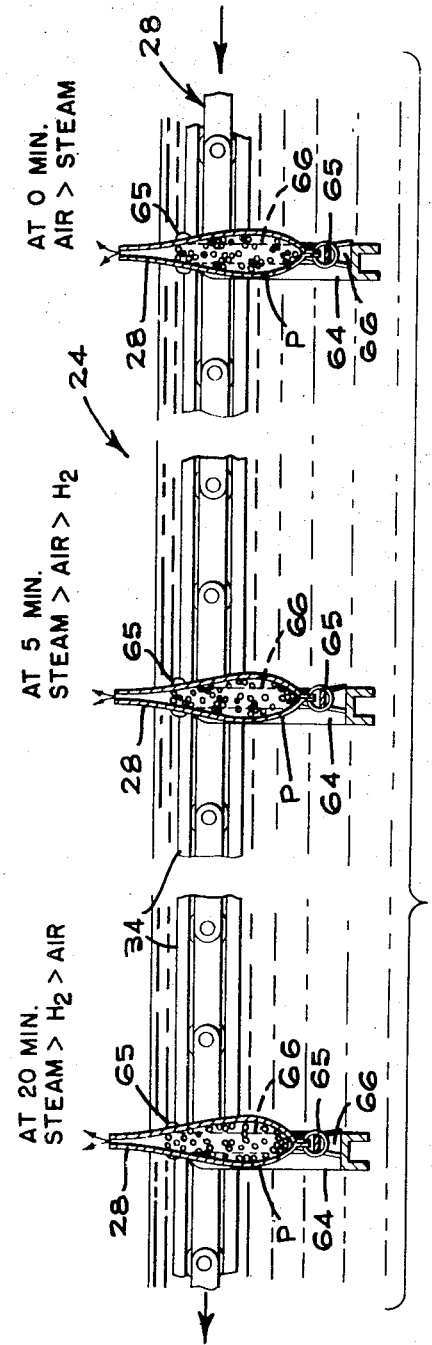
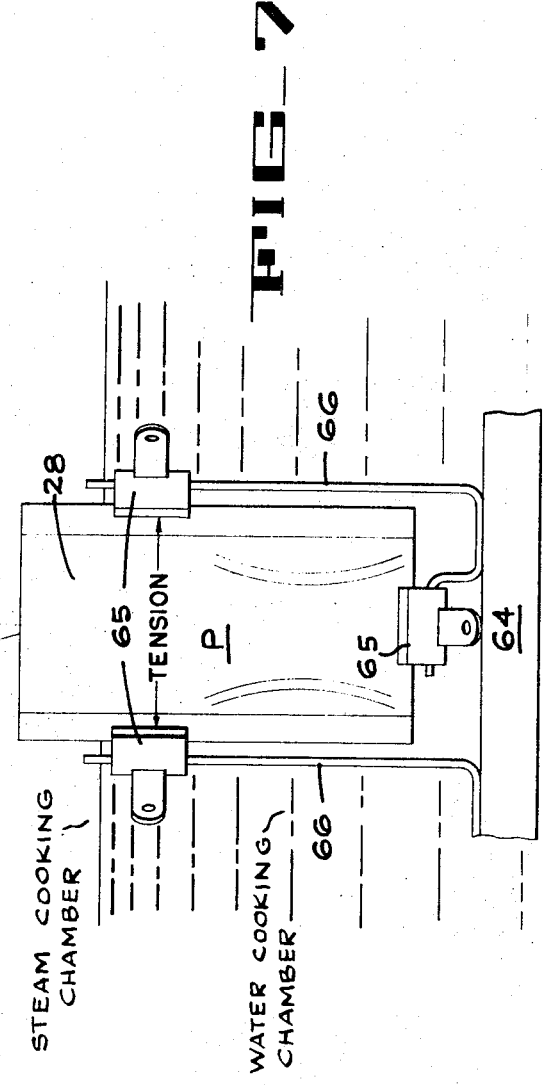

METHOD OF PURGING AIR FROM CONTAINERS

CROSS REFERENCE TO RELATED APPLICATIONS

The subject oxygen purging method and apparatus is related to my copending application Ser. Nos. 693,330 and 772,321, now U.S. Pat. No. 3,501,318 which issued on Mar. 17, 1970, and U.S. Pat. No. 3,528,826 which issued on Sept. 15, 1970, respectively. The pouches may be sealed in accordance with apparatus disclosed in my copending application Ser. No. 860,335 which was filed on Sept. 23, 1969. The present application also relates to the formation and the control of hydrogen within pouches as set forth in my applications filed on even date herewith and identified by Ser. No. 878,499 and Ser. No. 878,503. All of my above referred to applications have been assigned to the assignee of the present invention.

BACKGROUND OF THE INVENTION

1. Field of the Invention

The present invention relates to the art of packaging products in containers, such as flexible containers better known as pouches, and more particularly relates to a method for purging air and other gases from the pouches by the formation of hydrogen within the pouches during heat treatment.

2. Description of the Prior Art

One well known method of removing air from food filled pouches is to evacuate the air from the pouches by means of vacuum pumps, and then seal the pouches prior to sterilization of the product. Another method of removing air from pouches, which method is not prior art as to this invention, is as disclosed in my copending applications Ser. No. 693,330 and 772,321 now U.S. Pat. Nos. 3,501,318 and 3,528,826 respectively. In accordance with these patents a one-way valve is first formed across the mouth of each pouch and the pouch is thereafter repeatedly raised from and immersed into water during heat treatment thus progressively reducing the headspace causing steam formed in the pouch to purge other gases from its headspace. The pouch is then sealed prior to cooling at a time when the reduced headspace includes a considerable amount of steam, which steam is condensed upon cooling thereby further reducing the size of the headspace.

SUMMARY OF THE INVENTION

In accordance with the method and apparatus of the present invention, it has been discovered that when certain commercially available plastic-aluminum foil laminated pouches are filled with a water containing product and are heated to a sterilizing temperature a chemical reaction occurs between the water and the aluminum. The water diffuses through the inner plastic layers of the pouch walls to form aluminum oxide on the inner surfaces of the aluminum foil and also forms hydrogen which diffuses back through the inner plastic layers and accumulates within the pouches. After the initial headspace gases have been purged by immersion in water, the heat treatment of the pouches causes hydrogen to form and to enter the headspace of each pouch which, with the aid of steam also formed within the pouch, gradually causes the air and other headspace gases to purge therefrom through the one-way valve. After the product has been heated for a sufficient time and at a sufficient temperature, for example, 250°F, to sterilize the product, the pouch is sealed and is subsequently cooled thereby condensing the steam which further reduces the size of the headspace and leaves a gas within the headspace which is rich in hydrogen and low in damaging oxygen.

BRIEF DESCRIPTION OF THE DRAWINGS

FIG. 1 is a diagrammatic central vertical section through a superatmospheric cooker of the hydrostatic type arranged to purge air and other gases from the pouches in accordance with the method of the present invention, certain parts of the apparatus being broken away.

FIG. 1A is a diagrammatic perspective of a pouch and apparatus for filling the same.

FIG. 2 is a diagrammatic illustration of the manner in which hydrogen is formed in a pouch and the manner in which the hydrogen moves into and through the headspace to flush or purge gases therefrom out of the one-way valve.

FIG. 3 is a similar to FIG. 2 but illustrates a pouch after being sealed and cooled showing a small headspace that is rich in hydrogen.

FIG. 4 is a transverse vertical section taken along lines 4—4 of FIG. 1 illustrating carriers for supporting and forming a one-way valve in each pouch, and illustrating a sealing mechanism for sealing the mouth of each pouch.

FIG. 5 is a section taken along lines 5—5 of FIG. 4 showing the sealing mechanism in two operative positions.

FIG. 6 is a diagrammatic section taken along line 6—6 of FIG. 4 prior to reaching the discharge station and illustrating the manner in which hydrogen and steam is formed in and purged from the pouch during processing.

FIG. 7 is a diagrammatic elevation of the pouch being tensioned to provide a one-way valve therein.

DESCRIPTION OF THE PREFERRED EMBODIMENT

As fully disclosed in may aforementioned application Ser. No. 878,499 it has been discovered that hydrogen is formed within certain types of laminated plastic-aluminum foil flexible containers, better known as pouches, when food products within the pouches, such as fruit, vegetables or meat, are being cooked. It has been determined that water, which is either present in the food product or is added to the product in the pouch, diffuses through the inner plastic layers of these laminated pouch walls to form aluminum oxide on the contacted aluminum surfaces and to form hydrogen which diffuses back through the inner plastic layers and collects within the pouch in accordance with the following formula:

$$2Al + 3H_2O = 3H_2 + Al_2O_3$$

The pouches may be filled with a water containing food product or the like by a filling device 18 of any suitable well known type as diagrammatically illustrated in FIG. 1A.

It is also recognized that the above reaction takes place on the outer surfaces of the aluminum by virtue of water from the hot heat treatment medium diffusing through the outer plastic layers of the pouch. The above reaction takes place when the pouches are formed from laminated materials such as the following commercially available materials:

POUCHES (5 inches ×7 inches)

| Type | Outer Layer | Middle Layer | Inner Layer |
|---|---|---|---|
| C-79 (R2) Continental Can Co. | 0.5 mil polyester | 0.35 mil aluminum foil | 2.5 mil white opaque polyolefin |
| PZ5511-16 Dow | 0.5 mil polyester | 0.35 mil aluminum foil | 3.5 mil high density polyethylene |
| X-1084M 3M Company | 0.9 mil polyester (unoriented) | vacuum deposited metalized aluminum | 1.8 mil polyester oriented (heat sealable) |

In conducting tests to determine how much hydrogen was formed in each pouch, each pouch was filled with 5 ounces of warm water (140°F), the headspace volume was reduced by immersing the pouches in cold water to collapse the same, and the pouches were then sealed. This was followed by the first headspace measurement and then the pouches were processed for 15 minutes at 212°F. After cooling the pouches to room temperature, the second headspace measurement was made. The pouches were then heat processed a 250°F for 30 minutes, cooled to room temperature, and the headspace volume was measured for the third time. The heat processing media was water subjected to an overriding air pressure.

Headspace volume measurements were taken with the results listed below in Tables 1 and 2 which indicate the average of the measurements made on six pouches.

TABLE 1

Average Headspace Volumes

| Film Type | Before 212° F. Cook | After 212° F. Cook | After 250° F. Cook |
|---|---|---|---|
| C-79 | 0.4 cc. | 0.4 cc. | 6.1 cc. |
| Dow | 0.6 cc. | 1.1 cc. | 2.5 cc. |
| X-1084M | 0.7 cc. | 1.4 cc. | 2.1 cc. |

TABLE 2

Average Increase of Headspace Volumes

| Film Type | During 212° F. Cook | During 250° F. Cook |
|---|---|---|
| C-79 | 0.1 ± 0.2 cc. | 5.7 ± 0.2 cc. |
| Dow | 0.5 ± 0.4 cc. | 1.4 ± 0.4 cc. |
| X-1084M | 0.7 ± 0.5 cc. | 0.7 ± 0.3 cc. |

The first measurement of headspace, "Before 212°F Cook," of the sealed pouch was the quantity of air trapped in the pouches after a 5 second submergence in cold water. The second headspace measurement, "After 212°F Cook," was the combined amount of trapped air, dissolved uncondensible gases which have been forced into the gas phase at moderate temperatures, and possibly minute amounts of uncondensible gases that have been generated within the pouch due to chemical breakdown. The last measurement, "After 250°F Cook," includes the previously mentioned volumes, the additional discovered uncondensible gas volumes that have been liberated at high temperatures, and the majority of gases which are derived from chemical breakdown.

Another test was made to determine the headspace volume when handling a first group of pouches filled with water, and a second group of pouches filled with peas and with only enough water to form steam in the pouches during processing. The results of these tests are shown in Table 3.

TABLE 3

| | Headspace, volume (cc.) | | | | | | | |
|---|---|---|---|---|---|---|---|---|
| | Water | | | | Peas (very little liquid) | | | |
| Time | Total | Air | H₂O | H₂ | Total | Air | H₂O | H₂ |
| —0 min | 45 | 44 | 1 | | 90 | 88 | 2 | |
| Heated, 250° F.: | | | | | | | | |
| 0 min | 0.5 | 0.5 | 0.01 | | 40 | 39 | 1 | |
| 5 min | 0.5 | 0.01 | 0.5 | t | 40 | 10 | 30 | t |
| 10 min | 0.3 | t | 0.3 | t | 40 | 0.4 | 39 | 0.4 |
| 20 min | t | t | t | t | 40 | 0.01 | 40 | 0.4 |
| Cooled: | | | | | | | | |
| 2 hr | t | t | t | t | 0.4 | 0.01 | 0.01 | 0.4 |
| 6 mo | t | t | t | t | 0.05 | 0.05 | t | t |

In conducting this test the filled but unsealed pouches were first provided with one-way valves in their open mouths by applying a tensioning force across the mouth of each pouch in a manner described hereinafter as fully disclosed in my copending application Ser. No. 693,330, now U.S. Pat. No. 3,501,318. The headspace of certain of the pouches was then measured and recorded prior to submergence. Other pouches were then submerged in water at 250°F and were sealed at the end of their test periods and thereafter headspace measurements were taken. Headspace measurement were also taken 2 hours after removal from the water and were again taken 6 months thereafter. Each headspace measurement included the total volume in cubic centimeters, and the porportion of air, water vapor (H₂O), and hydrogen (H₂) in the total headspace. Some of these measurements were, in part, calculated from known relationships.

As indicated in Table 3, a large portion of air was purged through the one-way valve in each pouch immediately upon submergence. Thereafter, steam and hydrogen formed in the pouch gradually purged substantially all of the air out of the pouches. It will be noted that after 10 minutes of processing the headspace of the water filled pouches were reduced to such an extent that only a trace (t) of air and hydrogen was present therein. The volume of air and hydrogen was so small that it could not be reliably measured. It was recognized, however, that as processing continued these volumes became smaller. The total headspace of the water filled pouches also reduced to an unmeasurable amount during heat treatment because of vibrations and slight fluxuations in the water temperature which caused the pouch walls to almost completely collapse against the water within the pouches.

It will be noted that the pouches having peas and a very small amount of water therein has a much greater headspace because of the space between the individual peas. It will also be noted that 2 hours after cooling the remaining headspace volume is substantially all hydrogen, but that after 6 months of storage only a trace of hydrogen and water vapor remains in the headspace and the headspace has diminished in size and is substantially all air. The reason for this decrease in headspace volume and gradual change from substantially all hydrogen in the headspace to substantially all air in the headspace after prolonged storage is that hydrogen diffuses out of the pouches and oxygen plus nitrogen diffuses into the pouches through the heat sealable inner plastic layers at the seam lines. The rate of diffusion of hydrogen out of the pouches is about 8 times faster than the rate of diffusion of oxygen into the pouches, thus reducing the total headspace volume during prolonged storage. It has also been determined that if the pouches are sealed so that the inner plastic layers are substantially extruded from the seal areas thereby providing substantial aluminum-to-aluminum contact at all seal areas, an aluminum oxide envelope will surround the product and will cause the headspace to remain about the same as that shown for the 2 hour period even after the pouches have been storaged for about 6 months.

In accordance with the method of the present invention a hydrostatic cooking apparatus 20 (FIGS. 1, 4 and 5) may be used for purging air, and accordingly oxygen, from the pouches. The apparatus 20 comprises a hydrostatic inlet leg 22, a cooking chamber 24 having its lower portion filled with water and its upper portion filled with saturated steam at its sterilizing pressure and temperature, and an outlet hydrostatic leg 26 filled with cooling water. An endless conveyor 28 is continuously driven by motor 29 and is trained through the cooker 20 by a plurality of pairs of sprockets 30 keyed to shafts 32 and by guide tracks 34 (FIG. 5). At least one of the shafts 32 is connected to the motor 29 by a chain drive 35 or the like.

More particularly, the cooker 20 is defined by a pair of side walls 36 (FIG. 4) having end walls 38 and 40 and a floor 42 connected thereto in fluid tight relationship. The inlet leg 22 is defined by the side walls 36, end wall 38 and another wall 44; and the outlet leg 26 is defined by the side walls 36, the wall 40, and another wall 46. The upper portion of the cooking chamber 24 is defined by the side walls 36, a roof 48 and two relatively short downwardly extending walls 50 and 52. Steam at about 250°F and 15 psig is directed into the upper portion of the cooking chamber by a valve conduit 54, while the second valve conduit 56 is provided for purging the non-condensible gases from the cooking chamber 24. Water is introduced into the inlet leg 22 and discharge leg 26 through valved conduits 58 and 60, respectively, and is maintained at a level which will balance the pressure of steam in the upper portion of the cooking chamber 24. A valved conduit 61 is disposed near the lower end of the discharge leg so as to provide means for circulating cooling water in that leg and maintaining the cooling water at a low enough temperature to condense the condensible gases within the sealed containers being discharged therefrom. The water in the lower portion of the cooking chamber is heated to approximately 250°F by steam from a thermostatically controlled manifold 62.

As illustrated in FIGS. 4 to 7, the filled but unsealed pouches P are placed in carriers 64 and are held in place by spring clips 65 (FIG. 7) secured to the carriers. As illustrated, one spring clip 65 grips the lower end of the associated pouch P while two opposed spring clips 65 are mounted on the upper ends of resiliently stressed arms 66 (FIG. 7) which, when the upper clips are connected to the pouch P apply a tensioning force across the open mouth of the pouch thereby defining a one-way valve therein. The one-way valve is fully disclosed in my copending application Ser. No. 693,330, now U.S. Pat. No. 3,501,318, and in general allows gases to flow out of the pouch but prevents gases or liquids to flow into the pouch. Thus, the hydrogen and steam formed within each pouch P during sterilization flushes substantially all of the air and cooking gases out of the pouch past the one-way valve leaving a gas in the headspace which is primarily hydrogen and steam.

As indicated in FIG. 6 which refers to the processing of peas as indicated in Table 3, the pouches after 0 minutes in water a 250°F purges air and steam but has not as yet formed any hydrogen. After 5 minutes of processing the amount of steam being purged from the pouch is greater than the volume of air and a trace of hydrogen is also purged. After 20 minutes of processing, approximately the same amount of steam is purged but the volume or air is reduced to a very small amount so that a larger amount of hydrogen is purged from the pouch.

After the product within each pouch has been sterilized, the pouch is sealed by a sealing mechanism 70 at a sealing station SS that is disposed within the cooking chamber 24.

As diagrammatically illustrated in FIGS. 4 and 5, the sealing mechanism 70 comprises a pair of elongated sealing jaws 72 and 74 which are heated to a bonding temperature of between about 250°F to 325°F, preferably about 300°F, by electrical heating elements 76. The jaw 72 includes a small diameter pouch contacting surface while the jaw 74 has a flat resisting surface. The jaws 72 and 74 are mounted on the ends of rods 77 and 78, that are rigidly secured to pivot shafts 80 and 82 respectively. The shafts 80 and 82 are journaled in the side walls 36 and are interconnected by machined gears 84 and 86 for movement between an active sealing position illustrated in solid lines and an inactive position illustrated in dotted lines in FIG. 5. Crank arms 88 (FIG. 4) and 90 (FIG. 5) are keyed to opposite ends of the shaft 82 and are pivotally attached to the piston rods 92 of hydraulic power units 94 which have their cylinders 96 pivotally attached to brackets connected to the side walls 36. In order to actuate the power units 94 in timed relation with the movement of the conveyor 28, a cam 98 (FIG. 5) having evenly spaced lobes 100 on its periphery is secured to one of the conveyor shafts 32. An actuating element connected to the core 102 of a four-way valve 104 is urged against the periphery of the cam 98 by a spring 106. When the actuating element is resting on one of the lobes 100, the core 102 is disposed in the cross-passage position so that high pressure fluid flows from a conduit HP through the core, and through a conduit 108 having a speed control valve SC therein into the closed end of the power units thereby moving the sealing jaws 72 and 74 into active sealing engagement with the pouches P. When the actuating element moves off the lobes, the core 102 is shifted to the parallel passage position at which time high pressure fluid flows from the conduit HP, through conduit 110 having an adjustable speed control valve SC therein thereby moving the sealing jaws 72 and 74 to the inactive dotted line position shown in FIG. 5. During this time, low pressure fluid flows from the other end of the power units 94 through conduit 108, through the valve 104, and returned to the hydraulic pump (not shown) through conduit LP. An adjustable pressure regulator PR is placed in conduit 108 and is adjusted to provide a sealing pressure of about 7 to 20 pounds per linear inch of seal if an aluminum oxide-to-aluminum oxide seal is desired. If such a seal isn't desired and the pouch is to be sealed in the conventional manner then the pressure regulator PR may be adjusted to provide a sealing pressure of about 200 pounds per square inch being sealed. The speed control valves SC are adjusted so that this pressure is applied for about 1 to 5 seconds, preferably 2 seconds. When sealed in this manner, substantially aluminum-to-aluminum contact is established between the two pouch walls at the seal area across the mouth of the pouch. It As also be understood that the other edges of the pouch have also been sealed by apparatus such as disclosed in my copending application Ser. No. 878,503 in such a manner that substantial aluminum-to-aluminum contact is also made around the other edges of the pouch.

as fully disclosed in my last mentioned copending application, hydrogen will not diffuse out of an oxygen will not diffuse into pouches P which have been formed and sealed as above described, with the aluminum-foil of each wall in substantial aluminun-oxide-to aluminum oxide contact at the seam lines and seal areas, as diagrammatically illustrated in FIG. 3. It is recognized that the aluminum oxide which is formed on the inside and outside surfaces of the aluminum foil constitutes a substantially complete barrier against diffusion of hydrogen out of or the diffusion of oxygen into the pouches.

The sterilized and sealed pouches P are thereafter moved through the cooling water in the discharge leg 26 (FIG. 1) thereby condensing the steam sealed in the pouches and also terminating further formation of hydrogen. Thus, the so processed pouches P will provide a sealed flexible container or pouch having a sterilized food product therein and small headspace which is low in oxygen and high in hydrogen. As mentioned above the pouch is then sealed so as to provide a substantially complete aluminum envelope around the product which envelope has aluminum oxide formed on both its inner and outer surfaces. Since the aluminum oxide provides a substantially complete barrier to diffusion of hydrogen out of the pouch or diffusion of oxygen into the pouch, it will be recognized that the filled pouches will have a greatly improved storage life over plastic-foil pouches which have been processed and sealed in other manners.

From the foregoing description it is apparent that the method and apparatus of the present invention provides a method of forming hydrogen within pouches which hydrogen flushes air out of the pouches leaving a headspace gas that is rich in hydrogen. The apparatus also includes sealing means which is arranged to extrude all of the inner plastic layer away from the seal areas so as to substantially provide aluminum-to-aluminum contact of the two pouch walls at the seal areas. The heating or sterilizing process also forms aluminum oxide on the inner and outer surfaces of the aluminum foil that is present in the walls of the pouches, which oxide acts as a substantially complete barrier to diffusion of gases therethrough plus providing an improved packaged product having a long storage life.

Although the best mode contemplated for carrying out the present invention has been herein shown and described, it will be apparent that modification and variation may be made without departing from what is regarded to be the subject matter of the invention.

I claim:

1. A method of purging, sterilizing and packaging water containing food products or the like for substantially oxygen-free storage, comprising the steps of introducing that product into an open mouth pouch formed of a plastic-aluminum laminate with each wall including an aluminum layer laminated to an inner layer of heat sealable hydrogen and water diffusible plastic, forming a one-way valve at the mouth of the pouch, subjecting the pouch to a heat treatment medium at a temperature of about 250°F for at least 10 minutes and sufficient for heat sterilizing the food product and forming steam in the pouch as well as generating hydrogen in the pouch due to a reaction between the water in the product and the aluminum laminate, maintaining said heat treatment for a period sufficient to cause said generated hydrogen and steam to open the one-way valve for purging headspace gases from the pouch, thereafter heat sealing the pouch before air can enter the headspace, and cooling the pouch to condense the remaining steam therein, and packaging the thus treated food product.

2. A method of packaging and sterilizing a water containing product and purging gases from the headspace of a pouch filled with the water-containing product and formed by the walls of a plastic-aluminum laminate with each wall including an aluminum layer laminated to an inner layer of heat sealable hydrogen and water diffusible plastic and having all edges of the walls except an edge which defines a mouth sealed together; comprising the steps of forming a one-way valve in the pouch, subjecting the pouch to a heat treatment medium maintained at atmospheric pressure and at a temperature above the boiling point of water for a period sufficient to sterilize the product, maintaining said heat treatment for a period sufficient to form steam and hydrogen in the pouch in sufficient quantities and at a sufficient pressure for opening the one-way valve and purging headspace gases from the pouch, and thereafter sealing the pouch before air can enter the pouch to provide a gas in the headspace that is rich in hydrogen.

3. A method of packaging and sterilizing a water containing product and purging gases from the headspace of a container filled with the water containing product and formed by walls of a plastic laminate on aluminum with each wall including an inner hydrogen and water diffusible plastic layer and an aluminum layer with all edges of the walls except an edge which defines a mouth sealed together; comprising the steps of supporting the container, subjecting the container to a heat treatment medium maintained at temperatures above the boiling point from about 212°F to 250°F at atmospheric pressure of water for a period sufficient to sterilize the product, maintaining said heat treatment for a period sufficient to form steam and hydrogen in the container in sufficient quantities for purging air and cooking gases from the container, and thereafter sealing the container before air can enter the container to provide a gas in the headspace that is rich in hydrogen.

4. a method according to claim 3 wherein the temperature is between about 212°F and 250°F and the heat treatment period is in excess of about 15 minutes.

5. A method according to claim 4 wherein diffusion of water through the inner plastic layer causes a reaction with the aluminum which forms the hydrogen and which also forms a layer of diffusion inhibiting aluminum oxide on the inner surface of the aluminum layer in each wall.

6. A method according to claim 5 wherein the edges and the mouth of the pouch are sealed by application of heat and pressure sufficient to cause the plastic to be extruded from the seal area and the aluminum oxide in one wall to substantially contact with the aluminum oxide in the other wall thereby providing a barrier of aluminum oxide around the product which precludes diffusion of gases between the interior of the pouch and the atmosphere.

7. A method of packaging and sterilizing a water-containing product and purging gases from the headspace of a pouch filled with the water containing product and formed by walls of a plastic-aluminum laminate with each wall including an aluminum layer laminated to an inner layer of heat sealable hydrogen and water diffusible plastic having all edges of the walls except an edge defining a mouth sealed together; comprising the steps of forming a one-way valve in the mouth of the pouch, continuously moving the pouch along a predetermined path, immersing the pouch in a liquid to purge the headspace gases therefrom, heating the pouch to a sterilizing temperature while immersed in the liquid for forming steam in the pouch, continuing said heating for a sufficient period for causing water to diffuse through the inner plastic layers of the pouch and react with the aluminum forming hydrogen that diffuses back through the inner layers into and pouch, the pressure of accumulated steam and hydrogen within the pouch being effective to open the one-way valve and purge additional quantities of headspace gases therefrom, and thereafter sealing the mouth of the pouch before air can enter the pouch to provide a gas in the headspace that is rich in hydrogen.

8. A method according to claim 7 wherein the diffusion of water through the inner layer of plastic causes aluminum oxide to form on the inner surfaces of the aluminum layers of the walls, which aluminum oxide inhibits diffusion of gases therepast.

9. A method according to claim 8 wherein the edges of the pouch and the mouth of the pouch are sealed by application of sufficient heat and pressure to cause the aluminum in one wall to substantially contact the aluminum in the other wall thereby providing a barrier of aluminum oxide around the product which precludes diffusion of gases between the interior of the pouch and the outer atmosphere.

* * * * *

FO-1050
(5/69)

UNITED STATES PATENT OFFICE
CERTIFICATE OF CORRECTION

Patent No. 3,658,562          Dated April 25, 1972

Inventor(s) DONALD C. WILSON

It is certified that error appears in the above-identified patent and that said Letters Patent are hereby corrected as shown below:

Col. 2, line 23, change "may" to --my--.
Col. 3, line 26, change "THe" to --The--; line 56, change "an" to --and--.
Col. 5, line 75, delete "As", and insert -- will --.
Col. 6, line 7, change "an" to --and--.
Col. 7, line 33 or claim 4, change "a" to --A--.

Signed and sealed this 3rd day of October 1972.

(SEAL)
Attest:

EDWARD M. FLETCHER, JR.
Attesting Officer

ROBERT GOTTSCHALK
Commissioner of Patents